United States Patent [19]
Lilliestrale

[11] Patent Number: 5,621,621
[45] Date of Patent: Apr. 15, 1997

[54] POWER UNIT HAVING SELF-OSCILLATING SERIES RESONANCE CONVERTER

[75] Inventor: Magnus L. Lilliestrale, Stockholm, Sweden

[73] Assignee: Lindmark Electric AB, Stocksund, Sweden

[21] Appl. No.: 495,502

[22] PCT Filed: Jan. 21, 1994

[86] PCT No.: PCT/SE94/00043

§ 371 Date: Dec. 18, 1995

§ 102(e) Date: Dec. 18, 1995

[87] PCT Pub. No.: WO94/17584

PCT Pub. Date: Aug. 4, 1994

[30] Foreign Application Priority Data

Jan. 25, 1993 [SE] Sweden ................. 9300189

[51] Int. Cl.⁶ ................. H02M 3/335; H02M 3/24; H02M 5/42; H02M 7/44
[52] U.S. Cl. ................. 363/17; 363/22; 363/98
[58] Field of Search ................. 363/17, 22, 75, 363/90, 91, 98, 92, 93

[56] References Cited

U.S. PATENT DOCUMENTS

| | | | |
|---|---|---|---|
| 4,424,556 | 1/1984 | Maeda et al. ................. | 363/17 |
| 4,437,136 | 3/1984 | Yamamoto ................. | 361/146 |
| 4,851,739 | 7/1989 | Nilssen ................. | 315/278 |
| 5,111,380 | 5/1992 | Nilssen ................. | 363/132 |
| 5,132,889 | 7/1992 | Hitchcock et al. ................. | 363/17 |
| 5,198,969 | 3/1993 | Redl et al. ................. | 363/17 |

FOREIGN PATENT DOCUMENTS 399495  2/1978  Sweden ................. H02M 7/537

*Primary Examiner*—Peter S. Wong
*Assistant Examiner*—Bao Q. Vu
*Attorney, Agent, or Firm*—Cushman Darby & Cushman IP Group of Pillsbury Madison & Sutro LLP

[57] ABSTRACT

A power unit including a self-oscillating series resonance converter which is intended to supply a load, for instance an electric bulb, a battery charger and/or electronic equipment. The series resonance converter includes two mutually connected transistors, each of which is activated by a respective control transformer, and further includes an inductor and a capacitor which are connected in series. Each transistor and an associated series-connected capacitive voltage divider and/or a further transistor are connected in parallel with the inductor, capacitor and control transformer. The load is connected across the capacitor. The magnetic flux through the control transformer can be influenced by a magnetic flux applied externally via an electromagnet to change the oscillation frequency of the transistors and therewith the voltage output of the power unit.

6 Claims, 5 Drawing Sheets

POWER UNIT HAVING SELF-OSCILLATING SERIES RESONANCE CONVERTER

BACKGROUND OF THE INVENTION

The present invention relates to a power unit which includes a self-oscillating series-resonance converter and which functions to supply a load, such as an electric bulb, a battery charger and/or electronic equipment, wherein the series-resonance converter includes two mutually connected transistors, each of which is intended to be activated by a control transformer, and a series-connected inductor and capacitor, and wherein each transistor and a corresponding series-connected capacitive voltage divider belonging to the transistor and/or a further transistor is connected in parallel with the inductor, capacitor and control transformer, and wherein the load is connected across the capacitor.

A power unit of the aforedescribed kind is known to the art and is found described, for instance, in Swedish Patent Specification No. 7512267-1. This power unit operates in accordance with the series-resonance principle and provides many advantages over other known power units. These advantages include low switch losses at high operating frequencies, while problems relating to radio interference or disturbance are negligible.

One of the drawbacks with a power unit that operates in accordance with the series-resonance principle is that it requires the presence of complicated drive electronics. This results in a high total cost for the manufacture of such a power unit. Since there is a high demand for power units which can be used in low-price equipment, it is desirable to make the drive circuits of the power unit as cheap as possible.

SUMMARY OF THE INVENTION

A power unit including a self-oscillating series resonance converter which is intended to supply a load, for instance an electric bulb, a battery charger and/or electronic equipment. The series resonance converter includes two mutually connected transistors, each of which is activated by a respective control transformer, and further includes an inductor and a capacitor which are connected in series. Each transistor and an associated series-connected capacitive voltage divider and/or a further transistor are connected in parallel with the inductor, capacitor and control transformer. The load is connected across the capacitor. The magnetic flux through the control transformer can be influenced by a magnetic flux applied externally via an electromagnet to change the oscillation frequency of the transistors and therewith the voltage output of the power unit.

BRIEF DESCRIPTION OF THE DRAWINGS

The invention will now be described in more detail with reference to the accompanying drawings, wherein.

DETAILED DESCRIPTION

Figure 1:
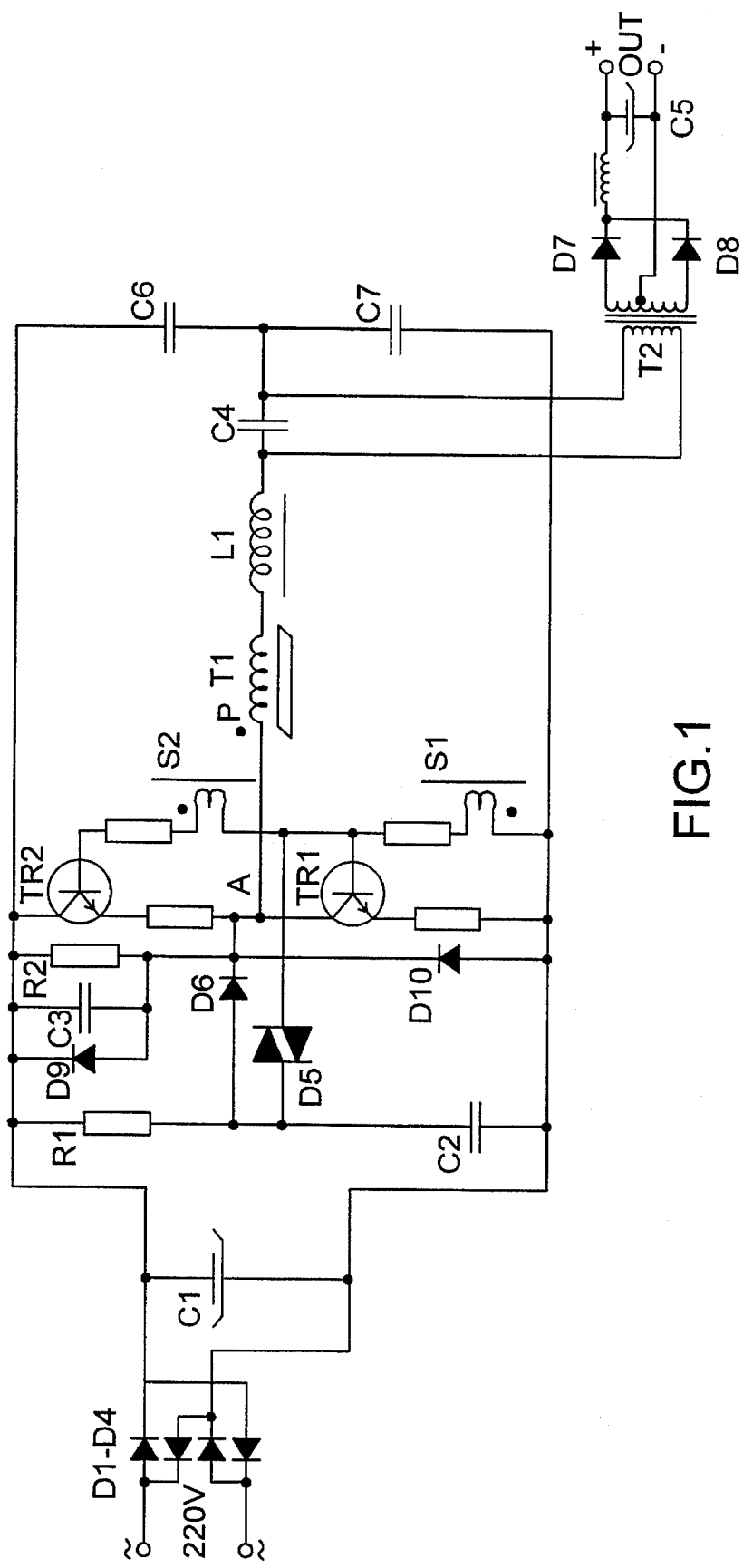
FIG. 1 is a circuit diagram for a power unit operating in accordance with the series-resonance principle.

The manner of operation of the power unit illustrated in FIG. 1 will now be described.

When the power unit is connected to the mains voltage, which in the present case reaches an alternating voltage of 220 volts, the voltage is rectified with the aid of four bridge-connected rectifier diodes D1–D4. The full-wave rectified mains voltage is filtered downstream of the diode bridge with the aid of a first capacitor C1. The direct voltage across the capacitor C1 will reach about 310 volts. A current which charges a capacitor C2 now passes through a resistor R1. When the voltage across this latter capacitor C2 has risen to above the threshold voltage of a trigger diode D5, the trigger diode is ignited or fired and conducts current to the base of a first transistor TR1. The purpose of the illustrated diode D6 is to prevent triggering of the trigger diode D5 when the circuit self-oscillates. The transistor TR1 is now conductive and a capacitor C3 is discharged via a further resistor. The voltage across the transistor TR1 will reach about 310 volts before the transistor becomes is turned on. When the transistor TR1 is turned on, current passes through the transformer T1, the inductor L1 and the capacitor C4. The current passing through the primary winding P of the transformer T1 gives rise to magnetic flux in the core K of the transformer T1. In turn, this flux induces a voltage in a secondary winding S1 of the transformer T1, which causes the first transistor TR1 to become conductive. The current passing through the transformer T1 will increase while the first transistor TR1 is operative. The core K of the transformer T1 becomes saturated after a given length of time, as illustrated in the FIG. 2 diagram. This causes the first transistor TR1 to cease to conduct. Because of the back electromotive force generated by the inductor L1, the voltage in the common contact point A of the first transistor TR1 and of a second transistor TR2 will be converted from low potential to high potential. The current passing through the transformer T1 thereafter changes direction, causing the earlier described sequence to be repeated. In turn, this causes the transistors TR1, TR2 to conduct alternately. When the components included are dimensioned correctly, the switching frequency of the circuit concerned will normally be higher than the resonance frequency of the inductor L1 and the capacitor C4. The voltage across the capacitor C4 is determined by how close the resonance frequency of the inductor L1 and the capacitor C4 lies to the switching frequency. As illustrated in the drawings, a load can be connected across the capacitor C4. The diodes D9–D10 are antiparallel to the transistors TR1 and TR2.

The illustrated arrangement thus provides an extremely simple construction. However, this construction has a serious drawback, namely that it is not possible to adjust or control the output voltage in a simple manner. The invention provides an arrangement which with the aid of an external magnetic field enables the core K of the transformer T1 to be saturated rapidly when the external magnetic field increases, and to be saturated more slowly when the external magnetic field decreases. This is achieved with the power unit illustrated in FIG. 3, which is a development of the arrangement illustrated in FIG. 1 and which operates in accordance with this principle. The voltage across the capacitor C4 is dependent on the oscillation frequency of the transistors TR1, TR2. Connected across the capacitor C4 is a transformer T2 which transforms the capacitor voltage to a suitable level. The voltage is rectified by the diodes D7, D8. The rectified voltage is then filtered by means of the inductor L2 and the capacitor C5. When the output voltage increases, so that the zener diode Z1 placed in the winding circuit of the electromagnetic T3 begins to conduct, current will pass through the zener diode and also through the winding W1 of the illustrated electromagnet T3. The current passing through the winding W1 gives rise to a magnetic flux which hastens saturation of the core K of the transformer T1, which in turn causes the oscillation frequency to increase and distance itself from the resonance frequency of the inductor L1 and the capacitor C4. As a result, the voltage across the capacitor C4 becomes lower, as does also the power unit output voltage. There is thus obtained a power unit having a controlled or adjusted output voltage.

Figure 4:
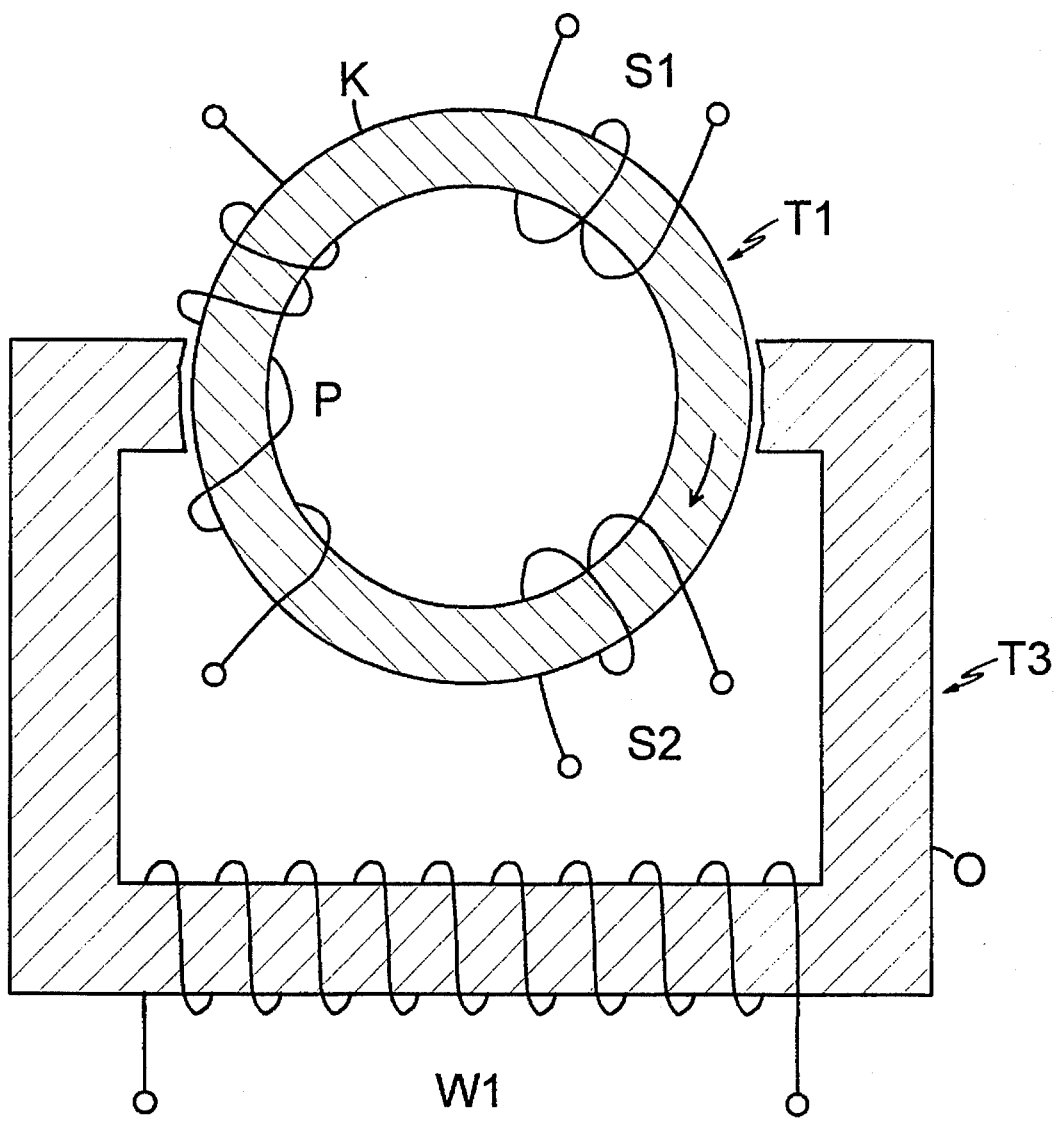
FIG. 4 is a view from above of the arrangement of a power unit control transformer having an electromagnet connected externally thereto in accordance with the principles of the invention.

FIG. 4 illustrates a suitable embodiment of the transformer and of the transformer magnetizing arrangement. The transformer T1 operates as a typical ferrite transformer, in which the primary winding P induces an alternating flux in the ring core K. In turn, the flux induced in the ring core K induces a voltage across the secondary windings S1, S2. The oscillation frequency is now governed by the speed at which the ring core K of the transformer T1 becomes saturated; see also FIG. 2. Application of an externally arriving flux in addition to the flux arriving from the primary winding P of the transformer T will cause the ring core K of the transformer T1 to be saturated more rapidly. Thus, the oscillation frequency increases. The magnetic flux induced externally via the electromagnetic T3 in the ring core K is added to the flux from the primary winding P of the transformer T1. The ring core K of the transformer T1 can thus be brought to saturation more or less quickly, by changing the current in the winding W1 of the electromagnet T3.

The electromagnet T3 used in the illustrated arrangement includes an iron yoke O manufactured from transformer plate in a known manner. As before mentioned, magnetization of the yoke O through the medium of the current in the winding P of the electromagnet T3 will also change the flux in the ring core K of the transformer T1. The iron yoke O is mounted externally of the ring core K with a connection transversely across the core, between the centre point of the primary winding P and the space between the secondary windings S1, S2.

Figure 2:
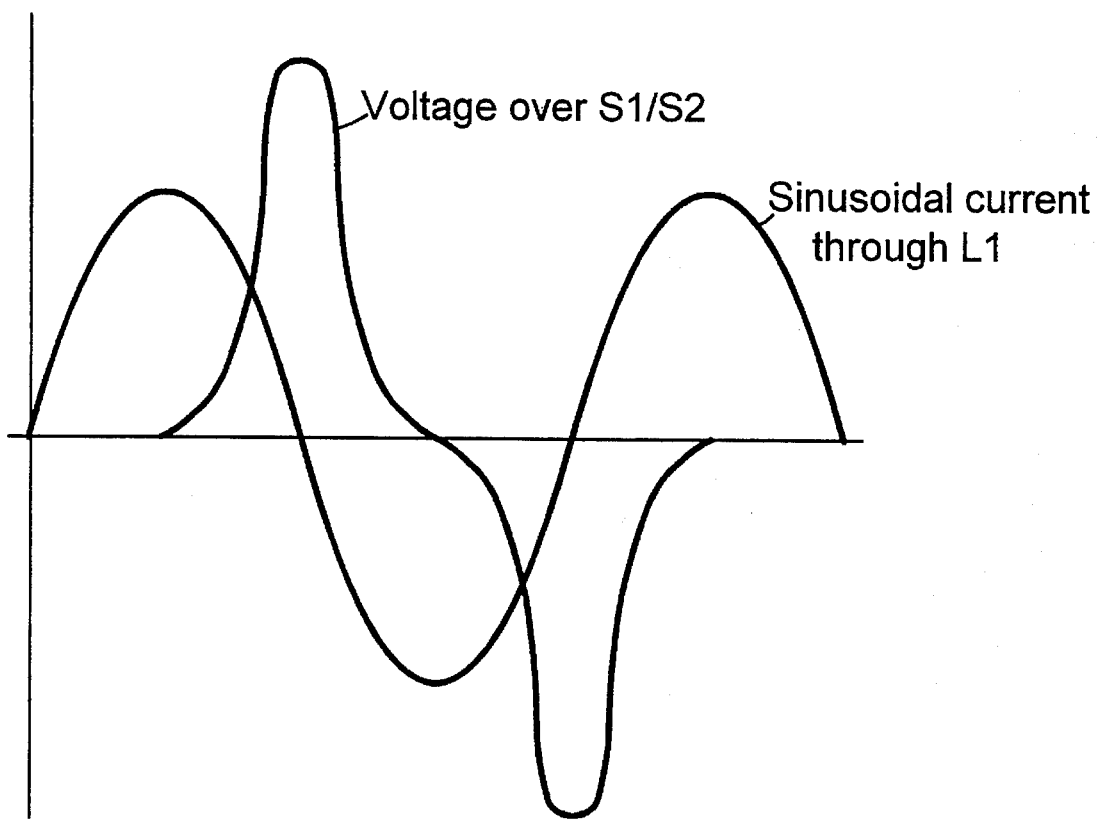
FIG. 2 is a diagram which illustrates a voltage/current relationship in the power unit.

The arrangement illustrated in FIG. 2 relates to a so-called half bridge, wherein capacitive voltage dividers C6, C7 are connected in parallel with respective transistors TR1, TR2. Naturally, the voltage dividers C6, C7 can be replaced with transistors TR3, TR4, so as to obtain a so-called full bridge according to FIG. 5.

Figure 3:
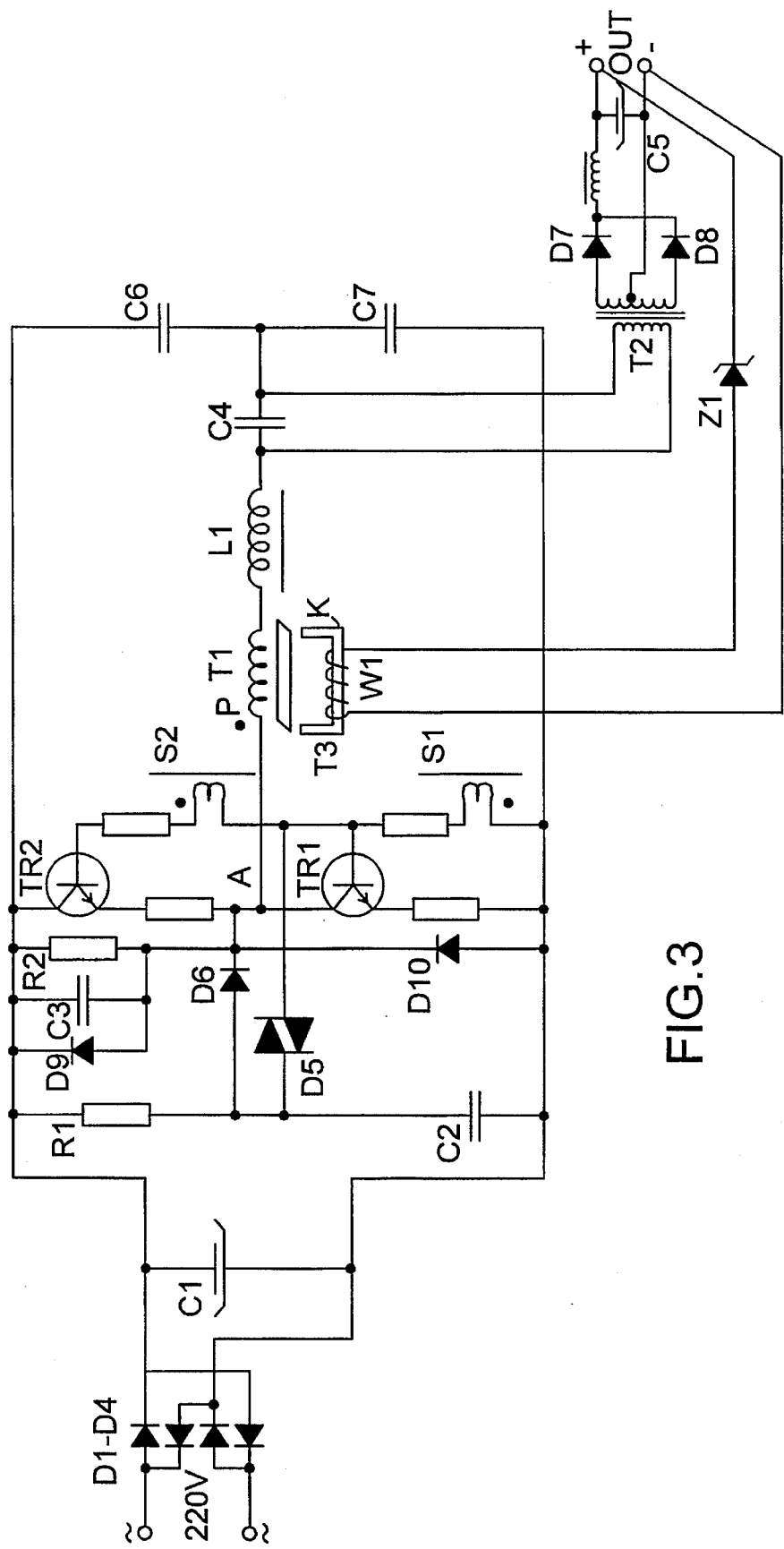
FIG. 3 is a circuit diagram for the power unit according to FIG. 1, said circuit enabling the magnetic flux through the control transformer belonging to the power unit to be regulated or adjusted.
Figure 5:
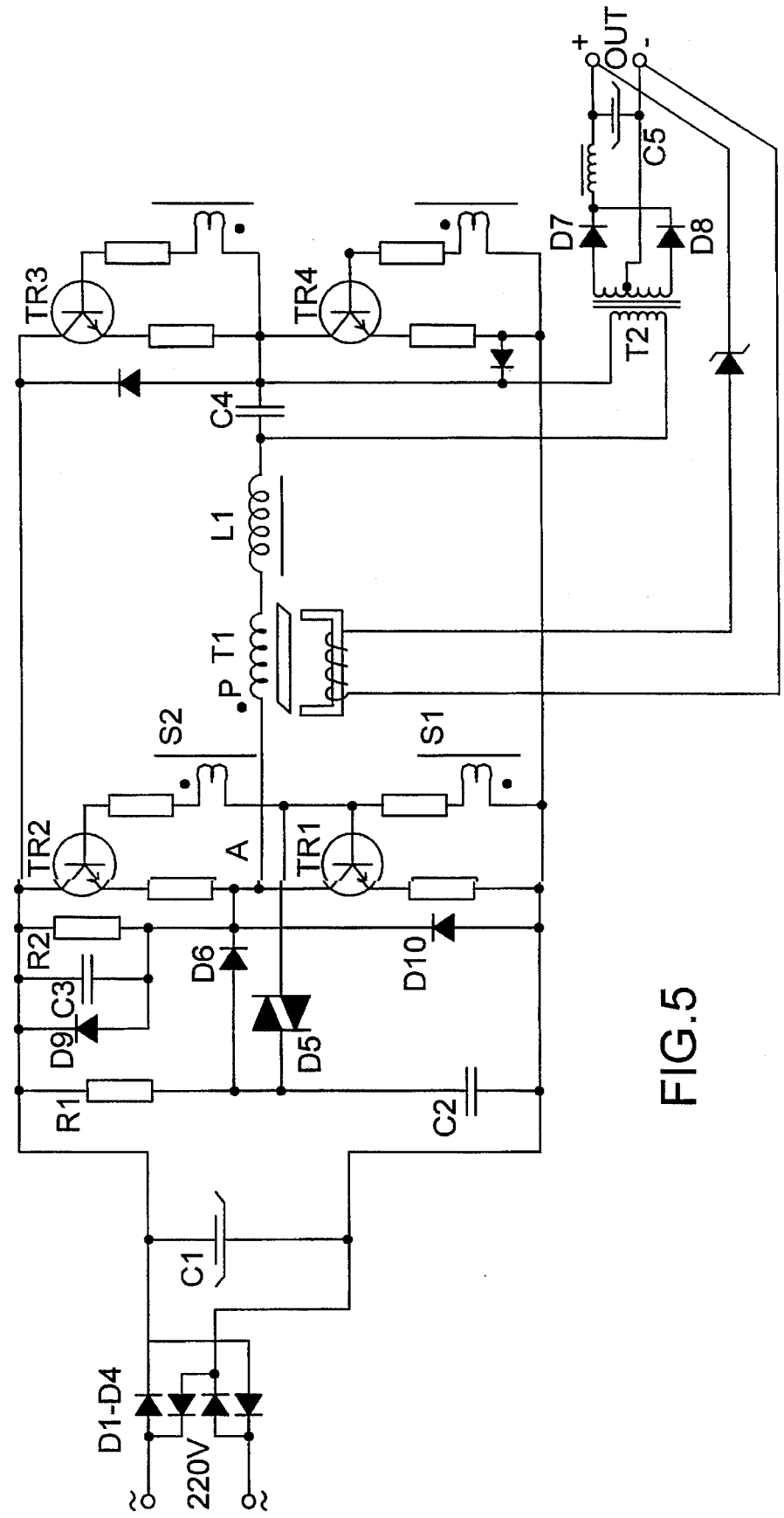
FIG. 5 is a circuit diagram which relates to a modified version of the power unit illustrated in FIG. 3.

The winding circuit of the electromagnet T3 is connected to the power unit output in both the arrangement illustrated in FIG. 3 and the arrangement illustrated in FIG. 5.

I claim:

1. A power unit which includes a self-oscillating series resonance converter and which is intended to supply a load, wherein the series resonance converter includes:

two transistors connected to one another, each of which is activated by a respective control transformer; and an inductor and a capacitor which are connected in series;

each said transistor having an associated series-connected capacitive voltage divider or a further transistor connected in parallel with said inductor, capacitor and control transformer;

a load connected across the capacitor;

magnetic flux through the control transformer arranged to be influenced by a magnetic flux applied externally via an electromagnet to change the oscillation frequency of the transistors and therewith the voltage output of the power unit.

2. The power unit according to claim 1, wherein:

the electromagnet has a winding circuit, and current through the winding circuit of the electromagnet is arranged to be controlled by the voltage output of the power unit.

3. The power unit according to claim 2, wherein:

said winding circuit includes a zener diode for detecting output voltage.

4. The power unit according to claim 1, wherein:

said control transformer includes a ferrite ring-core.

5. The power unit according to claim 4, wherein:

in addition to a primary winding having a center point, said control transformer also includes two secondary windings having the space between them, with connections to the bases of the respective ones of said transistors.

6. The power unit according to claim 5, wherein:

said electromagnet has a yoke and a ring core;

said yoke being comprised of a transformer plate, and is connected across the ring core (K) in the vicinity of said center point of said primary winding, and said space between said secondary windings.

* * * * *